(12) United States Patent
Okamoto et al.

(10) Patent No.: US 8,594,020 B2
(45) Date of Patent: Nov. 26, 2013

(54) WIRELESS COMMUNICATION SYSTEM, CONTROL APPARATUS, COMMUNICATION METHOD SWITCHING METHOD, AND PROGRAM

(75) Inventors: Tsukasa Okamoto, Shizuoka (JP); Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 13/058,668

(22) PCT Filed: Sep. 9, 2009

(86) PCT No.: PCT/JP2009/065714
§ 371 (c)(1),
(2), (4) Date: Feb. 11, 2011

(87) PCT Pub. No.: WO2010/035636
PCT Pub. Date: Apr. 1, 2010

(65) Prior Publication Data
US 2011/0267970 A1 Nov. 3, 2011

(30) Foreign Application Priority Data

Sep. 29, 2008 (JP) ................................. 2008-250332

(51) Int. Cl.
*H04W 4/00* (2009.01)
(52) U.S. Cl.
USPC ........................................................ 370/328
(58) Field of Classification Search
USPC .......... 370/310–350; 455/450–454, 462–464, 455/426.1, 422.1, 74, 550.1, 552.1, 553.1, 455/561
See application file for complete search history.

(56) References Cited

U.S. PATENT DOCUMENTS

| 2001/0021229 | A1* | 9/2001 | Belaiche | 375/295 |
| 2003/0129978 | A1* | 7/2003 | Akiyama et al. | 455/426 |
| 2004/0266493 | A1* | 12/2004 | Bahl et al. | 455/574 |
| 2005/0070294 | A1* | 3/2005 | Lyle et al. | 455/452.2 |
| 2005/0152321 | A1* | 7/2005 | Maufer et al. | 370/338 |
| 2005/0255892 | A1* | 11/2005 | Wong et al. | 455/562.1 |

(Continued)

FOREIGN PATENT DOCUMENTS

| JP | 2007068128 A | 3/2007 |
| JP | 2007251941 A | 9/2007 |
| JP | 2008067066 A | 3/2008 |

OTHER PUBLICATIONS

International Search Report for PCT/JP2009/065714 mailed Nov. 17, 2009.

*Primary Examiner* — Andrew Chriss
*Assistant Examiner* — Kenan Cehic

(57) ABSTRACT

A wireless communication system includes a plurality of base stations that can switch to either first or second communication method and that communicates wirelessly with terminals by the switched communication method and a control apparatus that manages the plurality of base stations. The control apparatus includes: an acquisition unit that acquires, from each base station, throughput of the base station and RSSI of each terminal that communicates wirelessly with the base station; and a switch instruction unit that instructs to each base station switch the current communication method when there is, among the plurality of base stations, a base station in which throughput has decreased within fixed interval, and instructs to re-switch to the communication method before switching to base stations in which throughput before and after switching of communication method is same but a specific standard, based on RSSI after switching of communication method, is not satisfied.

12 Claims, 7 Drawing Sheets

(56) References Cited

U.S. PATENT DOCUMENTS

| | | | |
|---|---|---|---|
| 2006/0029021 A1* | 2/2006 | Sakawa et al. | 370/331 |
| 2009/0005102 A1* | 1/2009 | Das et al. | 455/522 |
| 2009/0175182 A1* | 7/2009 | Shen et al. | 370/252 |
| 2010/0062757 A1* | 3/2010 | Reina | 455/424 |
| 2010/0166010 A1* | 7/2010 | Ukita et al. | 370/465 |

\* cited by examiner

Fig. 5 re-switching determination standards

| Throughput of BSn | Number of terminals engaged in wireless communication with BSn and in which RSSI is at least a threshold value | |
|---|---|---|
| $A_n < B_n$ | --- | Do not re-switch |
| $A_n = B_n$ | $C_n \leq D_n$ | Do not re-switch |
| $A_n = B_n$ | $C_n > D_n$ | Re-switch |
| $A_n > B_n$ | --- | Re-switch |

35 table

Fig. 7 re-switching determination standards

| | Throughput of BSn | Number of terminals engaged in wireless communication with BSn and in which RSSI is at least a threshold value or in which RSSI is less than a threshold value |
|---|---|---|
| Do not re-switch | $An < Bn$ | — |
| Do not re-switch | $An = Bn$ | $EHn \geqq ELn$ |
| Re-switch | $An = Bn$ | $EHn < ELn$ |
| Re-switch | $An > Bn$ | — |

35 table

US 8,594,020 B2

WIRELESS COMMUNICATION SYSTEM, CONTROL APPARATUS, COMMUNICATION METHOD SWITCHING METHOD, AND PROGRAM

TECHNICAL FIELD

The present invention relates to a wireless communication system, a control apparatus, a communication method switching method, and a program.

BACKGROUND ART

Wireless LAN (Local Area Network) communication is now widespread as a wireless communication technology. In a system realized by a wireless LAN, TE (Terminal Equipment), which are terminals for use in a wireless LAN, are able to connect with a network by way of wireless communication realized, by a wireless LAN that is carried out with a wireless LAN base station.

In recent years, WiMAX (Worldwide Interoperability for Microwave Access) communication is receiving attention as a new wireless communication technology. Even though realized by wireless communication, WiMAX communication offers the advantage of extremely high speed with communication speeds of 20 Mbps and more.

Base stations capable of switching among a plurality of communication methods have recently been proposed as base stations for wireless communication, an example of such a base station being the base station capable of switching to either wireless LAN communication or W-CDMA (Wideband Code Division Multiple Access) communication that is disclosed in Patent Document 1.

According to current trends, it is believed that there will be an increasing need in the above-described wireless LAN base station for enabling switching to WiMAX communication that is canted out with MS (mobile stations) that are WiMAX terminals.

LITERATURE OF THE PRIOR ART

Patent Documents
  Patent Document 1: IP 2007-068128 A

SUMMARY OF THE INVENTION

Problem to be Solved by the Invention

When a wireless LAN base station is of a configuration capable of switching to either wireless LAN communication or WiMAX communication, the throughput of the wireless LAN base station varies greatly depending on the switching method.

For example, when the wireless LAIN base station is switched to WiMAX communication, throughput remains low if there are few MS present in the vicinity. However, if there is a large number of TE in the vicinity when switching to WiMAX communication, switching the wireless LAN base station to wireless LAN communication is believed to increase the throughput.

Switching the communication method of a wireless LAN base station is therefore of extreme importance for increasing the throughput of the wireless LAN base station, and consequently, for achieving greater efficiency of wireless LAN communication and WiMAX communication.

It is therefore an object of the present invention to provide a wireless communication system, a control apparatus, a communication method switching method, and program that, by switching the communication method of base stations, can achieve greater efficiency of wireless LAN communication and WiMAX communication.

Means for Solving the Problem

The wireless communication system of the present invention includes a plurality of base stations that are capable of switching to either a first communication method or a second communication method and that carry out wireless communication with terminals by the switched communication method, and a control apparatus that manages the plurality of base stations; wherein:
  each of the plurality of base stations includes:
  a first communication unit that carries out wireless communication by the first communication method;
  a second communication unit that carries out wireless communication by the second communication method;
  a switch unit that switches the communication unit used in wireless communication to either the first communication unit or the second communication unit according to instructions from the control apparatus;
  a throughput measurement unit that measures the throughput of its own station and transmits information of the measured throughput to the control apparatus; and an RSSI measurement unit that measures the RSSI (Received. Signal Strength Indication) of each terminal that is engaged in wireless communication with its own station and transmits information of the measured RSSI to the control apparatus; and
  the control apparatus includes: an acquisition unit that acquires information of the throughput and RSSI from each of the plurality of base stations; and
  a switch instruction unit that issues instructions to each of the plurality of base stations to switch the current communication method when there is, among the plurality of base stations, a base station in which throughput decreased within a fixed interval, and further, that issues instructions to re-switch to the communication method that preceded switching to base stations in which throughput before and after switching of the communication method is the same but in which a specific standard based on RSSI after switching of the communication method is not satisfied.

The control apparatus of the present invention manages a plurality of base stations that are capable of switching to either a first communication method or a second communication method and that carry out wireless communication with terminals by the switched communication method, the control apparatus including:
  an acquisition unit that acquires from each of the plurality of base stations information of throughput of the base stations and RSSI of each terminal that is engaged in wireless communication with the base stations; and
  a switch instruction unit that issues instructions to each of the plurality of base stations to switch the current communication method when there is, among the plurality of base stations, a base station in which throughput decreased within a fixed interval, and further, that issues instructions to re-switch to the communication method that preceded switching to base stations in which throughput before and after switching of the communication method is the same but in which a specific standard based on RSSI after switching of the communication method is not satisfied.

The communication method switching method of the present invention realizes switching of the communication method of a plurality of base stations in a control apparatus that manages the plurality of base stations that are capable of switching to either a first communication method or a second communication method and that carry out wireless communication with terminals by the switched communication method, the communication method switching method including:

an acquisition step of acquiring from each of the plurality of base stations information of the throughput of the base stations and RSSI of each terminal engaged in wireless communication with the base stations:

a switch instruction step of issuing instructions to each of the plurality of base stations to switch the current communication method when there is, among the plurality of base stations, a base station in which throughput decreased within a fixed interval; and a re-switching instruction step of issuing instructions to re-switch to the communication method that preceded switching to base stations in which throughput before and after switching the communication method is the same but in which a specific standard based on RSSI after switching, of the communication method is not satisfied.

The program of the present invention causes a control apparatus, which manages a plurality of base stations that are capable of switching to either a first communication method or a second communication method and that carry out wireless communication with terminals by the switched communication method, to execute:

an acquisition procedure of acquiring from each of the plurality of base stations information of the throughput of the base stations and RSSI of each terminal that is engaged in wireless communication with the base stations;

a switching instruction procedure of issuing instructions to each of the plurality of base stations to switch the current communication method when there is, among the plurality of base stations, a base station in which throughput decreased within a fixed interval; and a re-switching instruction procedure of issuing instructions to re-switch to the communication method that preceded switching to base stations in which throughput before and after switching the communication method is the same but in which a specific standard based on RSSI after switching of communication method is not satisfied.

Effect of the Invention

In the present invention, when there is, among a plurality of base stations, a base station in which throughput decreased within a fixed interval, the control apparatus issues instructions to each of the plurality of base stations to switch the current communication method, and further, issues instructions to re-switch to the communication method that preceded switching to base stations in which the throughput before and after switching of the communication method is equal but in which a specific, standard based on RSSI after switching of the communication method is not satisfied.

In this way, by taking into consideration the RSSI of each terminal that is engaged in wireless communication to enable re-switching of the communication method for particular base stations, the present invention obtains the effect of enabling an improvement of the efficiency of wireless LAN communication and WiMAX communication even when throughput cannot be increased by switching the communication method.

BRIEF DESCRIPTION OF THE DRAWINGS

FIG. 5 is an explanatory view for describing the table that shows the re-switching determination standards used in the first example of operations shown in FIG. 4;

FIG. 7 is an explanatory view of a table that shows the re-switching determination standards used in the second example of operations shown in FIG. 6.

BEST MODE FOR CARRYING OUT THE INVENTION

A best mode for carrying out the present invention is next described with reference to the accompanying drawings.

In the present exemplary embodiment, a case is described by way of example in which base stations are wireless LAN base stations that are equipped with WiMAX communication capabilities and that can switch to either wireless LAN communication or WiMAX communication.

Figure 1:
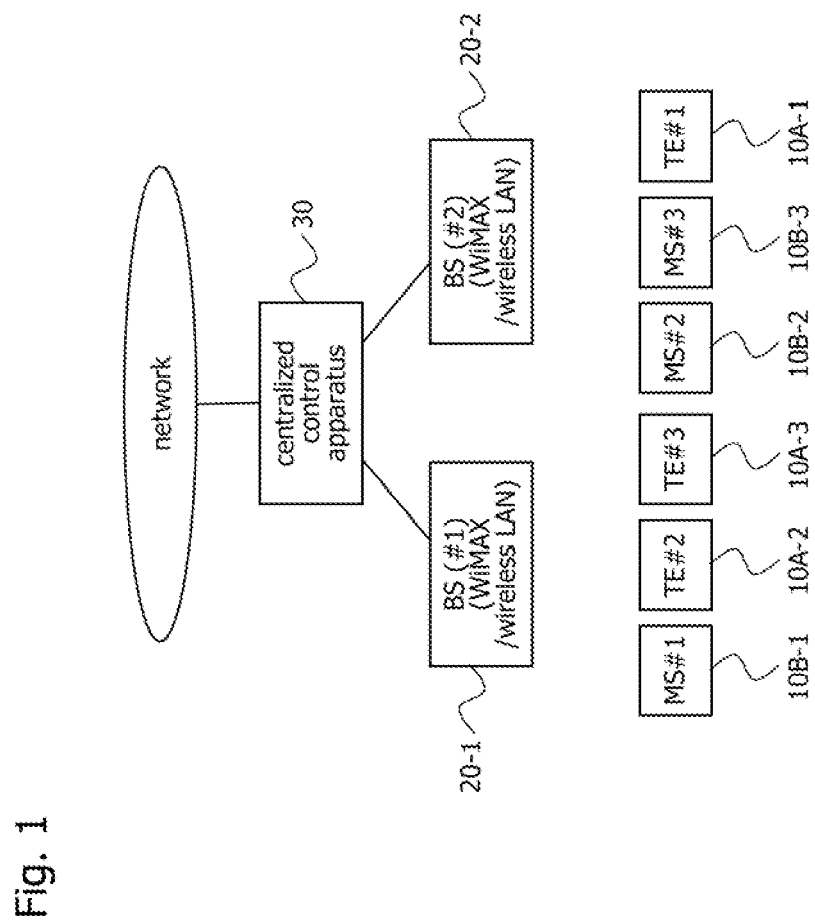
FIG. 1 is a block diagram showing the configuration of the wireless communication system of an exemplary embodiment of the present invention.

As shown in FIG. 1, the wireless communication system of the present exemplary embodiment includes: terminals (hereinbelow referred to as "TE") 10A-1-10A-3 for wireless LAN; terminals (hereinbelow referred to as "MS") 10B-1-10B-3 for WiMAX; base stations (hereinbelow referred to as "BS") (#1 and #2) 20-1 and 20-2, which are wireless LAN base stations equipped with WiMAX communication capabilities; and centralized control apparatus 30.

In the interest of simplifying the explanation. FIG. 1 shows three TE 10A-1-10A-3, three. MS 10B-1-10B-3, and two BS (#1 and #2) 20-1 and 20-2, but the present invention is not limited to these numbers. For example, the number of BS need only be plural.

BS (#1 and #2) 20-1 and 20-2 are capable of switching to either WiMAX communication or wireless LAN communication, an out wireless communication with MS 10B-1-10B-3 when switched to WiMAX communication, and carry out wireless communication with TE 10A-1-10A-3 when switched to wireless LAN communication.

Centralized control apparatus 30 realizes centralized control of BS (#1 and #2) 20-1 an 20-2.

Explanation here regards the internal configuration of BS (#1 and #2) 20-1 and 20-2 and centralized control apparatus 30.

Figure 2:
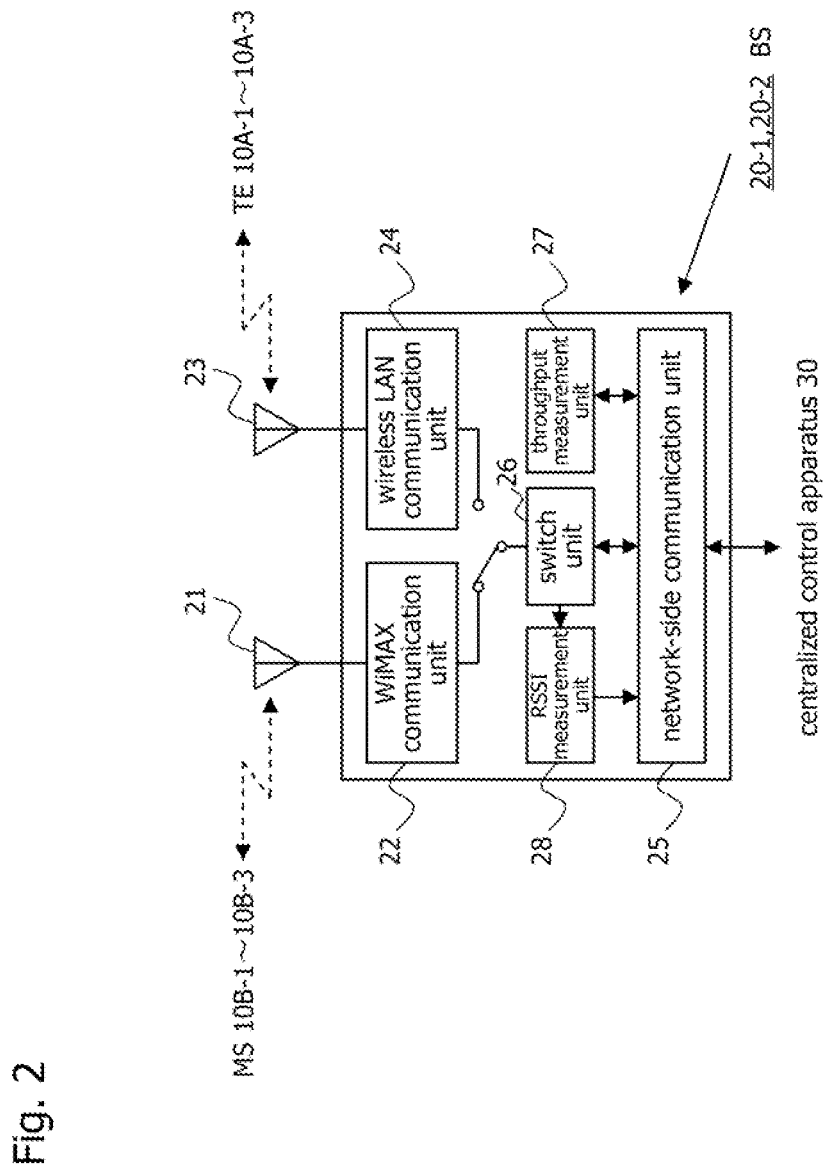
FIG. 2 is a block diagram showing the configuration of the base station shown in FIG 1.

As shown in FIG. 2, BS (#1 and #2) 20-1 and 20-2 each include: WiMAX antenna 21, WiMAX communication unit 22, wireless LAN antenna 23, wireless LAN communication unit 24, network-side communication unit 25, switch unit 26, throughput measurement unit 27, and RSSI (Received Signal Strength Indication: received field strength) measurement unit 28.

WiMAX communication unit 22 carries out wireless communication by means of WiMAX communication with MS 10B-1-10B-3 by way of WiMAX antenna 21.

Wireless LAN communication unit 24 carries out wireless LAN communication with TE 10A-1-10A-3 by way of wireless LAN antenna 23.

Network-side communication unit 25 carries out communication with centralized control apparatus 30.

Switch unit 26 switches the communication unit used in wireless communication to either WiMAX communication unit 22 or wireless LAN communication unit 24.

Throughput measurement unit. 27 measures throughput (units: Mbps) that indicates the data transfer rate per second between its own station and centralized control apparatus 30, and transmits information of the throughput that was measured to centralized control apparatus 30 by way of network-side communication unit 25. The method of measuring throughput can employ a known method and detailed explanation is therefore here omitted.

RSSI measurement unit 28 measures the RSSI (units: dBm) of the received signal that is received from each of MS 10B-1-10B-3 when wireless communication is switched to WiMAX communication unit 22 by switch unit 26, measures the RSSI of the received signal received from each of TE 10A-1-10A-3 when wireless communication is switched to wireless LAN communication unit 24, and transmits information of the RSSI that was measured to centralized control apparatus 30 by way of network-side communication unit 25. The method of measuring RSSI can employ a known method and detailed explanation is therefore here omitted.

Figure 3:
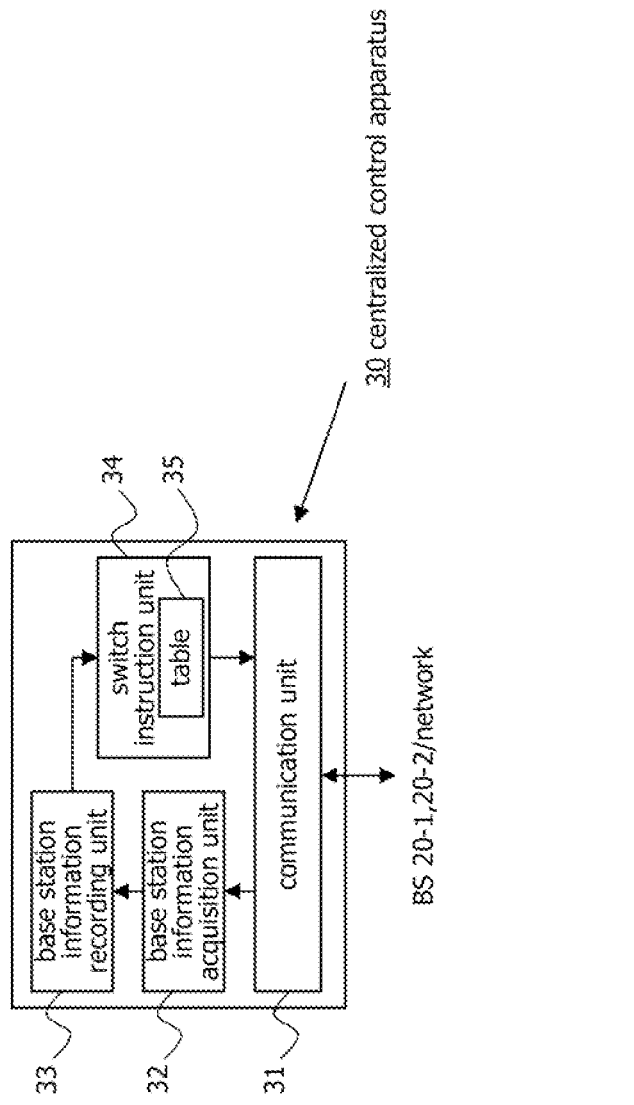
FIG. 3 is a block diagram showing the configuration of the centralized control apparatus shown in FIG. 1.

As shown in FIG. 3, centralized control apparatus 30 includes: communication unit 31, base station information acquisition unit 32, base station information recording unit 33, and switch instruction unit 34.

Communication unit 31 carries out communication with BS (#1 and #2) 20-1 and 20-2 and other devices (not shown) on the network.

Base station information acquisition unit 32 acquires information of throughput and RSSI that are received from each of BS (#1 and #2) 20-1 and 20-2 and stores the information in base station information recording unit 33.

Switch instruction unit 34 monitors the throughput of each of BS (#1 and #2) 20-1 and 20-2 at fixed intervals, and when there is a BS in which throughput decreased within a fixed interval, issues instructions to each of BS (#1 and #2) 20-1 and 20-2 to switch the current communication method.

Switch instruction unit 34 includes table 35 and further, after having issued instructions to switch the current communication method, issues instructions to re-switch to the communication method that preceded switching to specific BS. Table 35 will be explained hereinbelow.

More specifically, if there is, among BS (#1 and #2) 20-1 and 20-2, a BS in which throughput decreased from before to after switching of the communication method, instruction unit 34 issues instructions to the BS to re-switch.

Still further, if there is, among BS (#1 and #2) 20-1 and 20-2, a BS in which the throughput before and after switching of communication method is the same but in which a specific standard based on the RSSI after switching of communication method is not satisfied, switch instruction unit 34 issues instructions to the BS to re-switch.

The operations of the wireless communication system of the present exemplary embodiment are next described.

FIRST EXAMPLE OF OPERATIONS

Figure 4:
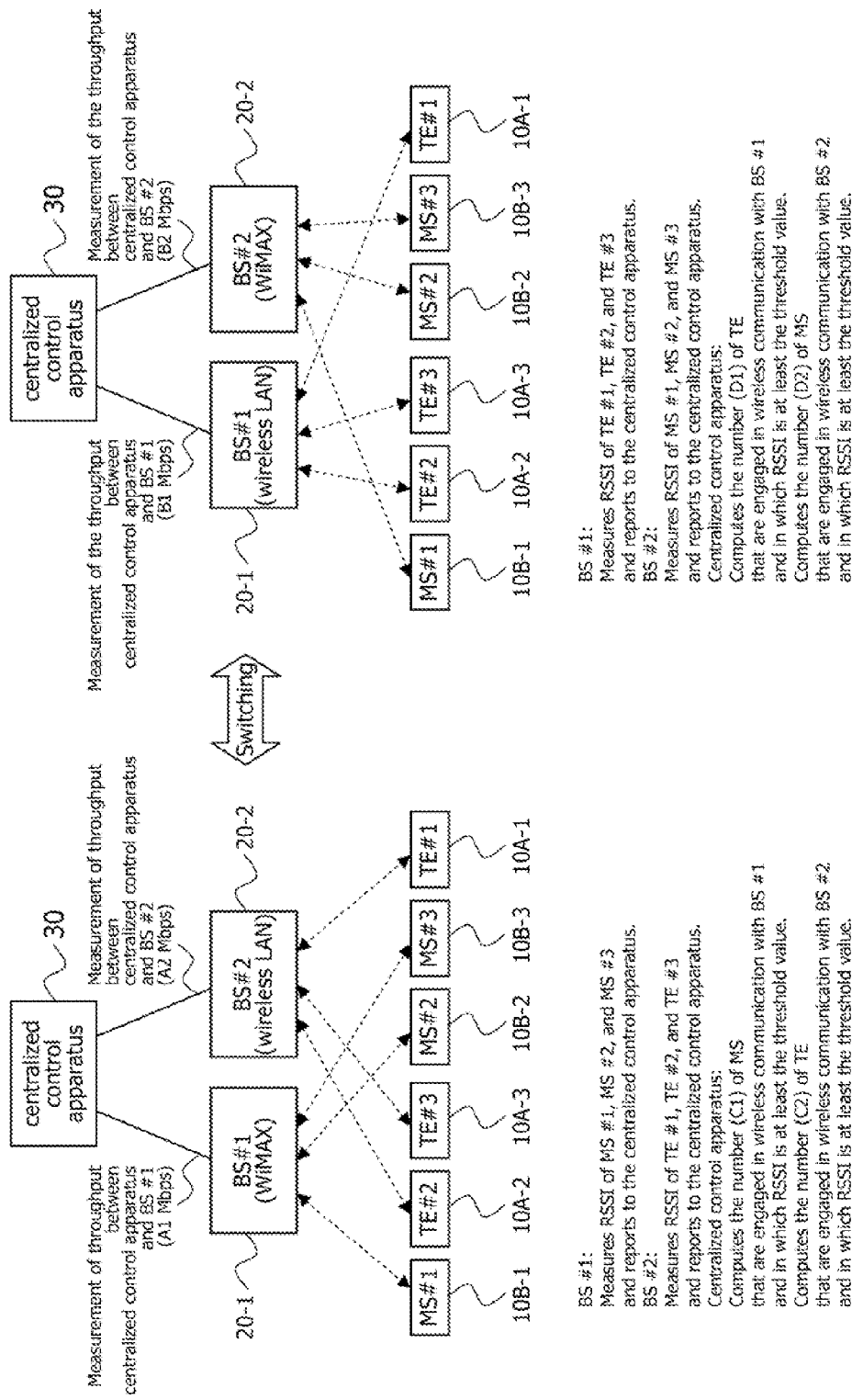
FIG. 4 is an explanatory view for describing a first example of the operations of the wireless communication system shown in FIG. 1.

A state is first assumed in which, as shown in FIG. 4, BS (#1) 20-1 is carrying out WiMAX communication and BS (#2) 20-2 is carrying out wireless LAN communication (State 1).

In this case. WiMAX communication unit 22 in BS (#1) 20-1 carries out wireless communication with each of MS 10B-1-10B-3. Throughput measurement unit 27 measures the throughput (A1 (Mbps)) with centralized control apparatus 30 and transmits this information to centralized control apparatus 30. In addition, RSSI measurement unit 28 measures the RSSI (dBm) of each of MS 10B-1-10B-3 and transmits this information to centralized control apparatus 30.

In BS (#2) 20-2, wireless LAN communication unit 24 carries out wireless communication with each of TE 10A-1-10A-3. Throughput measurement unit 27 measures throughput (A2 (Mbps)) with centralized control apparatus 30 and transmits this information to centralized control apparatus 30. In addition, RSSI measurement unit 28 measures the RSSI (dBm) of each of TE 10A-1-10A-3 and transmits this information to centralized control apparatus 30.

At this time, switch instruction unit 34 in centralized control apparatus 30 computes for BS (#1) 20-1 the number (C1) of MS in which the RSSI is at least a threshold value (for example, −75 dBm) among MS 10B-1-10B-3 that are engaged in wireless communication. The method of computing this number of MS can employ a method of computing the number of MS in which the average value of the RSSI within a fixed interval is at least a threshold value.

In addition, switch instruction unit 34 computes for BS (#2) 20-2 the number (C2) of TE in which the RSSI is at least a threshold value (for example, −65 dBm) among TE 10A-1-10A-3 that are engaged in wireless communication. The method of computing this number of TE can employ the same method as for MS.

Switch instruction unit 34 further determines whether there is among BS (#1 and #2) 20-1 and 20-2 a BS in which throughput has decreased within a fixed interval. For example, the method of determining a "decrease" in throughput can use a method in which a "decrease" is determined when the value at the start time and the value at the end time of a fixed interval are compared and the value at the end time is smaller by at least a threshold value than the value at the start time.

If there is a BS in which the throughput has decreased, switch instruction unit 34 issues instructions to each of BS (#1 and #2) 20-1 and 20-2 to switch the current communication method, whereby the state transitions to a state in which BS (#1) 20-1 is switched to wireless LAN communication and BS (#2) 20-2 is switched to WiMAX communication (state 2).

In this case, wireless LAN communication unit 24 in BS (#1) 20-1 carries out wireless communication with each of TE 10A-1-10A-3. In addition, throughput measurement unit 27 measures the throughput (B1 (Mbps)) with centralized control apparatus 30 and transmits this information to centralized control apparatus 30. RSSI measurement unit 28 measures the RSSI (dBm) of each of TE 10A-1-10A-3 and transmits this information to centralized control apparatus 30.

On the other hand. WiMAX communication unit 22 in BS (#2) 20-2 carries out wireless communication with each of MS 10B-1-10B-3. Throughput measurement unit 27 measures the throughput (B2 (Mbps)) with centralized control apparatus 30 and transmits this information to centralized control apparatus 30. In addition, RSSI measurement unit 28 measures the RSSI (dBm) of each of MS 10B-1-10B-3 and transmits this information to centralized control apparatus 30.

At this time, switch instruction unit 34 in centralized control apparatus 30 computes for BS (#1) 20-1 the number (D1) of TE in which the RSSI is at least a threshold value (for example −65 dBm) among TE 10A-1-10A-3 that are engaged in wireless communication and determines which of "increased," "decreased," and "equal" describes the number of terminals in which the RSSI is at least the threshold value after switching of the communication method. The method of determining the number of terminals in which the RSSI is at least the threshold value can employ a method in which, for example, "increased" is determined when the value (C1) before switching and the value (D1) after switching are compared and D1 is greater than C1 by at least a threshold value, "decreased" is determined when D1 is smaller than C1 by at least a threshold value, and "equal" is otherwise determined.

In addition, switch instruction unit 34 computes for BS (#2) 20-2 the number (D2) of MS in which RSSI is at least a threshold value (for example, −75 dBm) among MS 10B-1-10B-3 that are engaged in wireless communication, and determines which of "increased," "decreased," and "equal" describes the number of terminals in which RSSI before and after switching communication method is at least a threshold value. The method of determining the number of terminals in which RSSI is at least a threshold value may employ a method similar to that for BS (#1) 20-1.

Switch instruction unit 34 further determines for BS (#1) 20-1 which of "increased," "decreased," and "equal" describes the throughput before and after switching of the communication method. The method of determining throughput can employ a method in which, for example, the value (A1 (Mbps)) before switching is compared with the value (B1 (Mbps)) after switching and "increased" is determined when B1 is greater than A1 by at least a threshold value, "decreased" is determined when B1 is smaller than A1 by at least a threshold value, and "equal" is otherwise determined.

Switch instruction unit 34 further determines for BS (#2) 20-2 which of "increased," "decreased," and "equal" describes the throughput before and after switching of the communication method. The method of determining throughput can employ a method similar to that for BS (#1) 20-1.

Switch instruction unit 34 next determines the necessity for re-switching to the communication method that preceded switching for each of BS (#1 and #2) 20-1 and 20-2 based on table 35 shown in FIG. 5.

BS) 20-1 is here taken as an example.

If the throughput from before to after switching from WiMAX communication to wireless LAN communication is "decreased," i.e., if A1>B1, switch instruction unit 34 determines to carry out re-switching to WiMAX communication.

Alternatively, in some cases, the throughput from before to after switching from WiMAX communication to wireless LAN communication is "equal," i.e., A1=B1, but the number of terminals in which RSSI is at least a threshold value is "decreased," i.e., C1>D1. In such cases, the throughput is unchanged, but the state of WiMAX communication before switching is considered preferable from the standpoint of improving wireless communication because MS are thought to be greater in number than TE in the vicinity of BS (#1) 20-1. In this case as well, switch instruction unit 34 determines to carry out re-switching to WiMAX communication.

Switch instruction unit 34 otherwise determines not to implement re-switching to WiMAX communication.

Based on the above-described determination results, switch instruction unit 34 then issues instructions to re-switch to BS for which re-switching has been determined among BS (#1 and #2) 20-1 and 20-2.

However, if all of BS (#1 and #2) 20-1 and 20-2 are consolidated to WiMAX communication or to wireless LAN communication, an improvement of wireless communication may be achieved with respect to the consolidated communication method, but terminals of the other communication method are unable to carry out wireless communication because there is no BS that is switched to the other communication method.

To avoid this situation, when all of BS (#1 and #2) 20-1 and 20-2 are to be consolidated to WiMAX communication or to wireless LAN communication by the instruction of re-switching, switch instruction unit 34 either issues instructions to re-switch or halts instructions such that the BS in which the throughput is lowest by the consolidated communication method adopts a communication method other than the consolidated communication method.

SECOND EXAMPLE OF OPERATIONS

Figure 6:
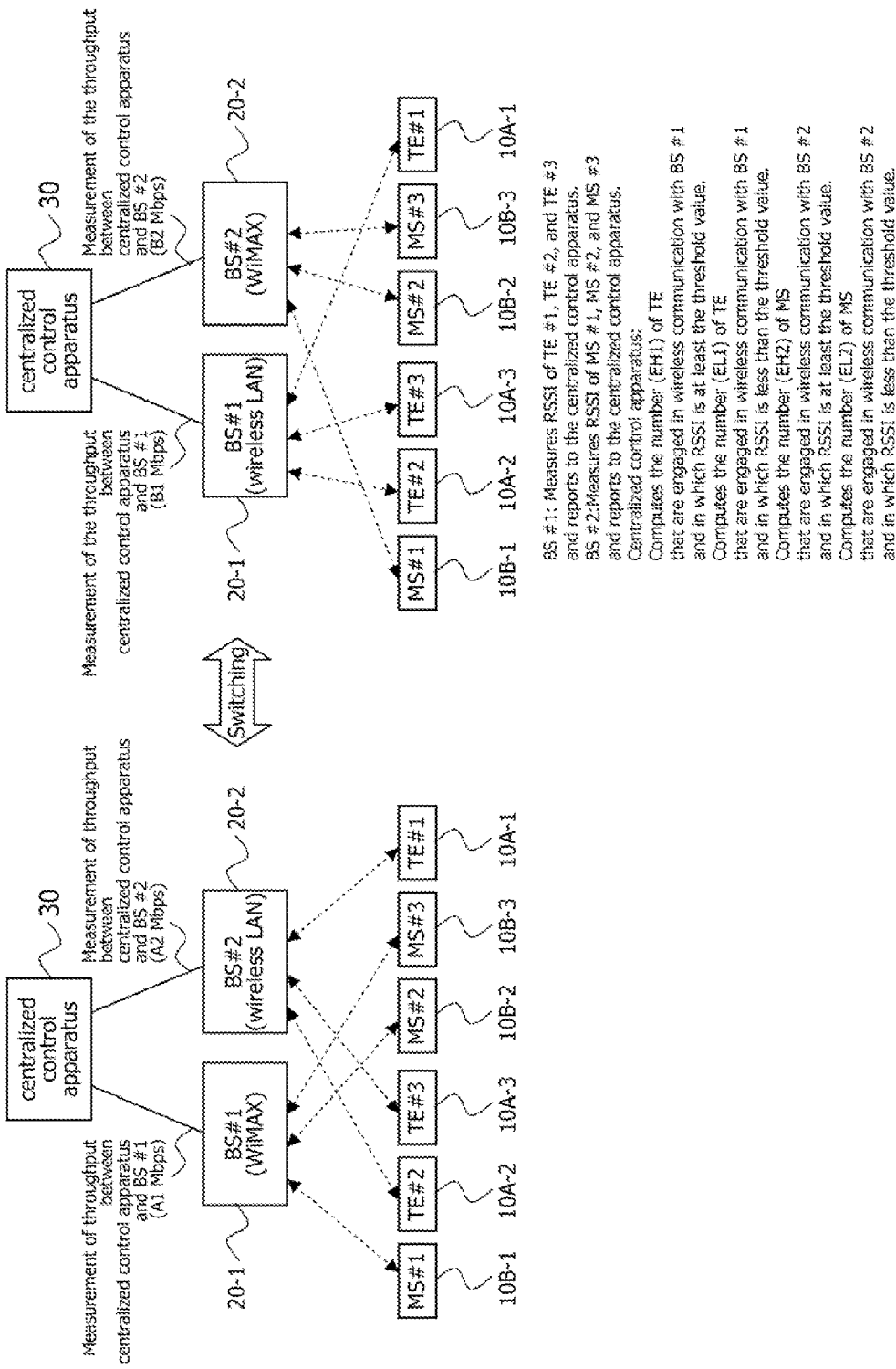
FIG. 6 is an explanatory view for describing the second example of operations of the wireless communication system shown in FIG. 1.

First, as shown in FIG. 6, a state is assumed in which BS (#1) 20-1 is carrying out WiMAX communication and BS (#2) 20-2 is carrying out wireless LAN communication (state 1).

In this case, wireless communication is carried out in BS (#1) 20-1 with each of MS 10B-1-10B-3, as in the first example of operations, throughput (A1 (Mbps)) with centralized control apparatus 30 is measured, and this information is transmitted to centralized, control apparatus 30.

In BS (#2) 20-2, wireless communication is carried, out with each of TE 10A-1-10A-3 as in the first example of operations, throughput (A2 (Mbps)) with centralized control apparatus 30 is measured, and this information is transmitted to centralized control apparatus 30.

At this time, switch instruction unit 34 in centralized control apparatus 30 determines whether there is a BS in which throughput has decreased within a fixed interval among BS (#1 and #2) 20-1 and 20-2, as in the first example of operations.

If there is a BIS in which throughput has decreased, switch instruction unit 34 issues instructions to each of BS (#1 and #2) 20-1 and 20-2 to switch the current communication method. In this way: the state transitions to a state in which BS (#1) 20-1 is switched to wireless LAN communication and BS (#2) 20-2 is switched to WiMAX communication (state 2).

In this case, wireless communication is carried out in BS (#1) 20-1 with each of TE 10A-1-10A-3, as in the first example of operations, throughput (B1 (Mbps)) with centralized control apparatus 30 and RSSI (dBm) of each of TE 10A-1-10A-3 is measured, and this information is transmitted to centralized control apparatus 30.

On the other hand, wireless communication is carried out in BS (#2) 20-2 with each of MS 10B-1-10B-3, as in the first example of operations, throughput (B2 (Mbps)) with centralized control apparatus 30 and RSSI (dBm) of each of MS 10B-1-10B-3 is measured, and this information is transmitted to centralized control apparatus 30.

At this time, switch instruction unit 34 in centralized control apparatus 30 computes for BS (#1) 20-1 the number (EH1) of TE in which RSSI is at least a threshold value (for example, −65 dBm) and the number (EL1) of TE in which RSSI is less than the threshold value among TE 10A-1-10A-3 that are engaged in wireless communication and determines the sizes of these numbers.

In addition, switch instruction unit 34 computes for BS (#2) 20-2 the number (EH2) of MS in which RSSI is at least a threshold value (for example, −75 dBm) and the number (EL2) of MS in which RSSI is less than the threshold value among MS 10B-1-10B-3 that are engaged in wireless communication and determines the sizes of these numbers.

As in the first example of operations, switch instruction unit 34 further determines which of "increased," "decreased," and "equal" describes the throughput from before to after switching of the communication method for each of BS (#1 and #2) 20-1 and 20-2.

Based on table 35 shown in FIG. 7, switch instruction unit 34 next determines whether re-switching to the communication method that preceded switching, is necessary for each of BS (#1 and #2) 20-1 and 20-2.

The case of BS (#1) 20-1 is here offered as an example.

if throughput from before switching to after switching from WiMAX communication to wireless LAN communication has decreased, i.e., if A1>B1, switch instruction unit 34 determines to carry out re-switching to WiMAX communication.

In some cases, the throughput from before switching to after switching from WiMAX communication to wireless LAN communication is equal, i.e., A1=B1, but there are more TE in which RSSI is less than the threshold value than TE in which RSSI is at least the threshold value, i.e., EL1<EL1. In such cases, throughput has not changed, but it is believed that there are more TE remote from BS (#1) 20-1 than TE that are close to BS (#1) 20-1, and the state of wireless LAN communication after switching is therefore not considered preferable from the standpoint of improving the efficiency of wireless communication. In such cases, switch instruction unit 34 determines to carry out re-switching to WiMAX communication.

Switch instruction unit 34 otherwise determines not to implement re-switching to WiMAX communication.

Switch instruction unit 34 next, based on the above-described determination results, issues instructions to re-switch to, of BS (#1 and #2) 20-1 and 20-2, those BS for which the implementation of re-switching has been determined.

However, as in the first example of operations, when all of BS (#1 and #2) 20-1 and 20-2 are to be consolidated to WiMAX communication or to wireless LAN communication when switch instruction unit 34 issues instructions to re-switch, switch instruction unit 34 either halts instruction or issues instructions to re-switch to the BS in which throughput is lowest by the consolidated communication method such that a communication method other than the consolidated communication method is adopted.

In the present exemplary embodiment as described hereinabove, if there is among BS (#1 and #2) 20-1 and 20-2 a BS in which throughput has decreased within a fixed interval, centralized control apparatus 30 issues instructions to each of BS (#1 and #2) 20-1 and 20-2 to switch the current communication method, and further, issues instructions to re-switch to the communication method that preceded switching to BS in which throughput from before to after switching of communication method decreased among BS (#1 and #2) 20-1 and 20-2.

In this way, the throughput of BS (#1 and #2) 20-1 and 20-2 can be increased by switching and re-switching of the communication method in each of BS (#1 and #2) 20-1 and 20-2, whereby an improvement of the efficiency of wireless LAN communication and WiMAX communication can be achieved.

Furthermore, in the present exemplary embodiment, centralized control apparatus 30 issues instructions to re-switch to the communication method that preceded switching to, among BS (#1 and #2) 20-1 and 20-2, those BS in which throughput before and after switching of the communication method is equal, but in which a specific standard based on the RSSI before and after switching of the communication method is not satisfied.

More specifically, centralized control apparatus 30 determines that among BS (#1 and #2) 20-1 and 20-2. BS, for which the number of terminals, in which the RSSI during wireless communication before switching the communication method is at least a threshold value, surpasses the number of terminals, in which the RSSI during wireless communication after switching is at least the threshold value, are BS in which the specific standard is not satisfied and therefore issues instructions to re-switch.

Alternatively, centralized control apparatus 30 determines that, among BS (#1 and #2) 20-1 and 20-2. BS, for which the number of terminals, in which RSSI during wireless communication is less than the threshold value after switching of the communication method, surpasses the number of terminals in which the RSSI during wireless communication is at least the threshold value, are BS that do not satisfy the specific standard and therefore issues instructions to re-switch.

In this way, even if throughput cannot be increased by switching the communication method for a particular BS, re-switching of the communication method can be implemented while taking into consideration the RSSI of each terminal that is engaged in wireless communication, whereby a greater improvement in the efficiency of wireless LAN communication and WiMAX communication can be achieved.

Furthermore, in the present exemplary embodiment, when all of BS (#1 and #2) 20-1 and 20-2 are consolidated to WiMAX communication or to wireless LAN communication when centralized control apparatus 30 issues instructions to re-switch, centralized control apparatus 30 either issues instructions to re-switch or halts instruction to the BS in which throughput is lowest by the consolidated communication method such that a communication method other than the consolidated communication method is adopted.

In this way, the consolidation of all BS (#1 and #2) 20-1 and 20-2 to WiMAX communication or to wireless LAN communication can be avoided.

Although the present invention has been described with reference to the above-described exemplary embodiment, the present invention is not limited to the above-described exemplary embodiment. The constitution and details of the present invention are open to various modifications within the scope of the present invention that will be clear to one of ordinary skill in the art.

The method implemented in centralized control apparatus 30 of the present invention may be applied to a program for realizing execution by a computer. This program can be stored on a recording medium and can be provided to the outside by way of a network.

The present application is the National Phase of PCT/JP2009/065714, filed Sep. 9, 2009, which claims priority based on Japanese Patent Application Publication No. 2008-250332 for which application was submitted on Sep. 29, 2008 and incorporates all of the disclosures of that application.

What is claimed is:

1. A wireless communication system that includes a plurality of base stations that are capable of switching to either a first communication method or a second communication method and that carry out wireless communication with terminals by the switched communication method, and a control apparatus that manages said plurality of base stations; wherein:

each of said plurality of base stations comprises:
a first communication unit that carries out wireless communication by said first communication method;
a second communication unit that carries out wireless communication by said second communication method;
a switch unit that switches a communication unit used in wireless communication to either said first communication unit or said second communication unit according to instructions from said control apparatus;

a throughput measurement unit that measures throughput of its own base station and transmits information of measured throughput to said control apparatus; and an RSSI measurement unit that measures RSSI (Received Signal Strength Indication) of each terminal that is engaged in wireless communication with that base station and transmits information of the measured RSSI to said control apparatus; and said control apparatus comprises:

an acquisition unit that acquires information of throughput and RSSI from each of said plurality of base stations; and a switch instruction unit that issues instructions to each of said plurality of base stations to switch the current communication method when there is, among said plurality of base stations, a base station in which throughput decreased within a fixed interval, and further, that issues instructions to re-switch to the communication method that preceded the switching to base stations in which throughput before and after the switching of the communication method is the same but in which a specific standard based on RSSI after the switching of the communication method is not satisfied.

2. The wireless communication system as set forth in claim 1, wherein said switch instruction unit determines selected base stations among said plurality of base stations, for which a first number of terminals exceeds a second number of terminals, the first number of terminals being the terminals in which RSSI during wireless communication before switching of communication method is at least a predetermined threshold value, the second number of terminals being the terminals in which RSSI during wireless communication after switching is at least a predetermined threshold value, the selected base stations being base stations in which said specific standard is not satisfied, and wherein said switch instruction unit issues said instructions to re-switch.

3. The wireless communication system as set forth in claim 1, wherein said switch instruction unit determines, among said plurality of base stations after switching of communication method, base stations, for which the number of terminals, in which RSSI during wireless communication is less than a predetermined threshold value, surpasses the number of terminals, in which RSSI during wireless communication is at least a predetermined threshold value, as base stations in which said specific standard is not satisfied and issues said instructions to re-switch.

4. The wireless communication system as set forth in claim 1, wherein:

said first communication method is a WiMAX (Worldwide Interoperability for Microwave Access) communication method; and said second communication method is a wireless LAN (Local Area Network) communication method.

5. A control apparatus that manages a plurality of base stations that are capable of switching to either a first communication method or a second communication method and that carry out wireless communication with terminals by the switched communication method, said control apparatus comprising:

an acquisition unit that acquires from each of said plurality of base stations information of throughput of the base stations and RSSI of each terminal that is engaged in wireless communication with the base stations; and a switch instruction unit that issues instructions method to each of said plurality of base stations to switch the current communication when there is, among said plurality of base stations, a base station in which throughput decreased within a fixed interval, and further, that issues instructions to re-switch to the communication method that preceded the switching to base stations in which throughput before and after the switching of communication method is the same but in which a specific standard based on RSSI (Received Signal Strength Indication) after the switching of the communication method is not satisfied.

6. The control apparatus as set forth in claim 5, wherein said switch instruction unit determines selected base stations among said plurality of base stations, for which a first number of terminals exceeds a second number of terminals, the first number of terminals being the terminals in which RSSI during wireless communication before switching of communication method is at least a predetermined threshold value, the second number of terminals being the terminals in which RSSI during wireless communication after switching is at least a predetermined threshold value, the selected base stations being base stations in which said specific standard is not satisfied, and wherein said switch instruction unit issues said instructions to re-switch.

7. The control apparatus as set forth in claim 5, wherein said switch instruction unit determines, among said plurality of base stations after switching of communication method, base stations, for which the number of terminals, in which RSSI during wireless communication is less than a predetermined threshold value, surpasses the number of terminals, in which RSSI during wireless communication is at least a predetermined threshold value, as base stations in which said specific standard is not satisfied and issues said instruction to re-switch.

8. The control apparatus as set forth in claim 5, wherein:

said first communication method is a WiMAX communication method; and said second communication method is a wireless LAN communication method.

9. A communication method switching method that realizes switching of the communication method of a plurality of base stations in a control apparatus that manages said plurality of base stations that are capable of switching to either a first communication method or a second communication method and that carry out wireless communication with terminals by the switched communication method, said communication method switching method comprising:

an acquisition step of acquiring from each of said plurality of base stations information of the throughput of the base stations and RSSI (Received Signal Strength Indication) of each terminal engaged in wireless communication with the base stations;

a switch instruction step of issuing instructions to each of said plurality of base stations to switch the current communication method when there is, among said plurality of base stations, a base station in which throughput decreased within a fixed interval; and a re-switching instruction step of issuing instructions to re-switch to the communication method that preceded the switching to base stations in which throughput before and after the switching communication method is the same but in which a specific standard based on RSSI after the switching of communication method is not satisfied.

10. The communication method switching method as set forth in claim 9, wherein, in said re-switch instruction step, selected base stations are determined among said plurality of base stations, for which a first number of terminals exceeds a second number of terminals,
- the first number of terminals being the terminals in which RSSI during wireless communication before switching of communication method is at least a predetermined threshold value,
- the second number of terminals being the terminals in which RSSI during wireless communication after switching is at least a predetermined threshold value,
- the selected base stations being base stations in which said specific standard is not satisfied, and
- wherein in said re-switch instruction step said instructions to re-switch are issued.

11. The communication method switching method as set forth in claim 9, wherein, in said re-switching instruction step, among said plurality of base stations after switching of communication method, base stations, for which the number of terminals, in which RSSI during wireless communication is less than a predetermined threshold value, surpasses the number of terminals, in which RSSI during wireless communication is at least a predetermined threshold value, are determined as base stations in which said specific standard is not satisfied and said instructions to re-switch are issued.

12. The communication method switching method as set forth in claim 9, wherein:
- said first communication method is a WiMAX communication method; and
- said second communication method is a wireless LAN communication method.

* * * * *